May 19, 1970 — J. METROPOULOS — 3,512,689

FOLDABLE SKI RACK

Filed March 11, 1968

INVENTOR.
James Metropoulos
BY
Sheldon W. Rothstein
ATTORNEY

# United States Patent Office 3,512,689
Patented May 19, 1970

3,512,689
FOLDABLE SKI RACK
James Metropoulos, Dudley, Mass., assignor to Albert Fins, Irving Fins, and Gerald Langarten, all of Worcester, Mass.
Filed Mar. 11, 1968, Ser. No. 711,950
Int. Cl. B60r 9/12
U.S. Cl. 224—42.1                                    9 Claims

ABSTRACT OF THE DISCLOSURE

A ski rack capable of being mounted on an automobile, wherein said rack is foldable when not in use.

BACKGROUND OF THE INVENTION

This invention relates generally to the ski art, and more particularly, to a ski rack capable of being used with an automobile wherein said rack is foldable to occupy greatly decreased longitudinal space when not in use.

In recent years the ski industry has enjoyed a rapid expansion. Largely due to the increase in leisure time available, millions of people take to the slopes each year. Since a majority of these people own skis, which are, at best, cumbercome to transport, a secondary industry has been spawned which seeks to provide means to facilitate the expeditious conveyance of such skis to and from skiing areas. Since skis are generally too long and occupy too much space to be placed within an automobile, various configurations of ski racks have been manufactured in order to securely mount skis on the roof of an automobile. Although most ski racks in common use are capable of safely transporting skis, they have numerous drawbacks.

For example, most heretofore known ski racks are extremely expensive to manufacture since they are large and of complex construction. Furthermore, these racks are usually unsightly and because of their size have a tendency to move about, thereby scratching or marring the roof of the automobile on which they are mounted as well as the skis retained thereon.

One of the major problems confronting skiers today is the fact that the above-mentioned ski racks, when not in use, are extremely difficult to handle and store. Because of their size and bulkiness, they require large amounts of storage space, and may easily damage goods stored therewith.

SUMMARY OF THE INVENTION

The instant invention overcomes all of the above-mentioned drawbacks now existing in ski racks. The ski rack of the instant invention is a relatively small, roof mounted rack, molded or extruded from rubber or a similar material. The instant ski rack is capable of transporting as many skis as may reasonably be desired without marring or scratching the skis or the roof of an automobile on which it is mounted. Furthermore, and of primary consequence, the rack is foldable and, therefore, occupies greatly decreased space in length when not in use, thus overcoming the storage problem.

The ski rack constituting the persent invention is constructed of, preferably, two identical sections held together by a linking member. When the ski rack is mounted on the roof of an automobile the sections are in an elongated position, securely fastened at each end to the rain gutter of the automobile by conventional means. When not in use, one of the sections is folded beneath the other section and locked securely in place using any suitable, conventional fastening means.

It is, therefore, an object of this invention to provide a ski rack which is foldable when not in use so as to occupy a minimum amount of storage space.

It is a further object of this invention to provide a ski rack which may be detachably secured to the roof of an automobile without marring or scratching the surface of the latter.

It is still a further object of this invention to provide a ski rack which is economical to produce and which utilizes conventional, currently available materials that lend themselves to standard mass-production manufacturing techniques.

The present invention accordingly comprises the article possessing the features, properties, and the relation of elements which are exemplified in the following detailed disclosure, and the scope of the application of which will be indicated in the appended claims.

DESCRIPTION OF THE DRAWING

Referring now to FIG. 1 of the drawing we are shown the ski rack, 10, of the instant invention mounted by any conventional mounting means such as clamps, 12, upon the roof of an automobile, 14. Although it is necessary to use two such ski racks, one each to rigidly secure the front and back portions, respectively, of the skis, for simplicity, only one such rack is shown in position. The ski rack, 10, is made up of, preferably two identical sections, 16, held in place by link, 18. A plurality of skis, 20, are shown held in position in the ski rack, 10, by bars, 22. Although three pair of skis are shown in FIG. 1, the ski rack may hold four pairs of skis as shown in FIG. 2 or any other number depending upon the length and configuration of the rack, 10, and the dimension of the bearing medium, i.e., the roof top.

For a more detailed description of the invention we new refer to FIG. 2. Since the ski rack, 10, is made up of two identical sections, 16, the following description will refer to only one such section. It should be noted that like elements in both sections will be represented by identical numerals.

Figure 1:
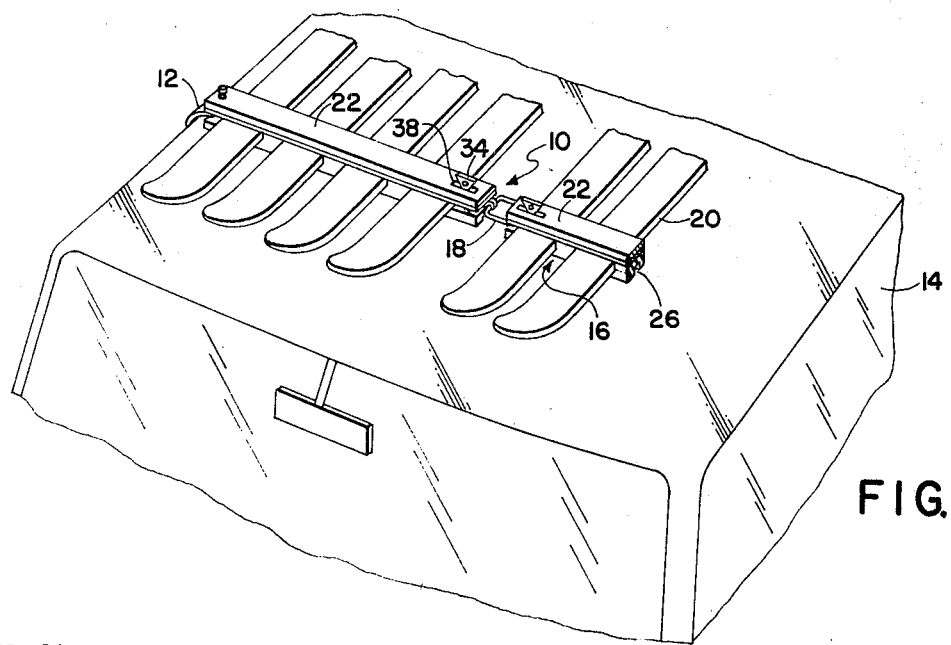
FIG. 1 is a perspective fragmentary view of the ski rack of the instant invention mounted on the roof of an automobile.

Section 16 is made up of a base, 17, of any suitable material which is incapable of scratching a painted surface, such as, for example, hard rubber or a plastic-coated metallic number, etc. The base 17 has thereon a plurality of upstanding elements, 24, for the purpose of separating the skis resting therebetween. A groove, 26, (see FIG. 1) runs the entire length of base 17 for flexibility and lightness of the section. The base, 17, may preferably be manufactured by either a conventional molding or extrusion process, although any other suitable manufacturing technique may be employed. The section 16 is further made up of a bar, 22, which is supported on base 17 by bracket, 28, which is in turn fastened to base 17 by any suitable fastening means such as rivet 30. The bar, 22, is made of any suitable material, preferably a metal, such as aluminum, and is coated with a layer of a substance such as rubber, 29, for example, to prevent marring the skis. The bar, 22, is held loosely on bracket 28 by a suitable fastening means, such as rivet 32, thereby allowing the bar to be swung over the twist bracket, 34. The twist bracket, 34, is also mounted on base 17 by any suitable fastening means such as rivet 36. A hole, 38 (see FIG. 1) in bar 22 allows the bar to be placed over the top portion of twist bracket 34. The twist bracket, 34, has a hole, 40, in the top portion thereof, so that a suitable locking device (not shown) may be placed therethrough to securely fasten the bar 22 in place.

The sections, 16, are held together by a suitable fastening means such as linking member 18. The linking member, 18, more clearly shown in FIG. 3, is preferably of a rectangular configuration, and is pivotably secured at one end to mount 42 and at the other end to mount 44 both of which are integral with twist bracket 34, and extend slightly beyond the base 17. The length of the linking member, 18, is approximately equal to twice the height of the rack. Because of their sizes and the relationship between the above-mentioned elements, sections 16 of rack 10 may be folded, one section beneath the other, as shown in phantom in FIG. 2. The sections, 16, are then locked in place by any conventional locking means such as catch 46 and eye 48.

Referring now to FIG. 4, there is shown a different type of linking member, 18' which may be used in place of linking member, 18, shown in FIG. 3. Linking member, 18', comprises a coil spring fastened at each end to mounts 42 and 44.

Figure 5:
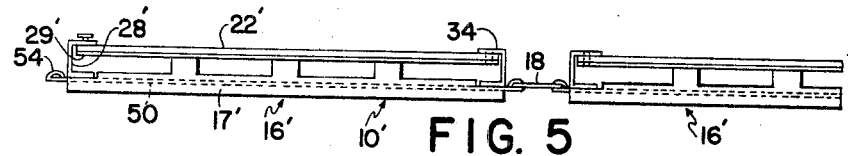
FIG. 5 is a sectional side elevation view of a modification of said ski rack.

Referring now to FIG. 5, wherein a slightly modified ski rack 10' is depicted. Again, since sections 16' of ski rack 10' are identical, the description will refer to only one such section. A band, 50, made of any suitable material, but preferably a metal, has fastened thereto, by any conventional fastening means such as, for example, welding, U-brackets 28' and 34'. The entire member, including brackets 28', 34' and band 50 are imbedded within the base, 17', during a molding operation. The remainder of the ski rack, 10' is identical to rack 10 except that the linking member, 18, may be of a length slightly less than that used on ski rack 10. 54 and 55 are identical to 42 and 44 and comprise a suitable means for attaching rain gutter clamps, 12. However, in any embodiment utilizing a rigid linking member it is most desirable that said member be approximately equal to or less than twice the base height.

Figure 6:
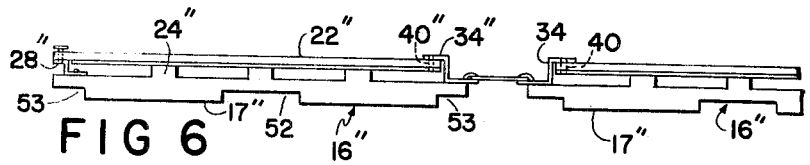
FIG. 6 is a side elevation view of another modification of said ski rack.

FIG. 6 represents still another modification of ski rack 10. Ski rack 10'' shown in FIG. 6 is one which can be readily extruded from hard rubber. Sections 16'' are made up of bases, 17''', which, in addition to having upstanding elements, 24, and lengthwise grooves 26 (FIG. 1) have crosswise grooves, 52 and 53 therein, and Z-bracket, 34''. Ski rack 10'' can be readily extruded with cutouts 52 and 53, thereby decreasing the amount of material required without substantially decreasing the strength of rack 10''.

Figure 8:
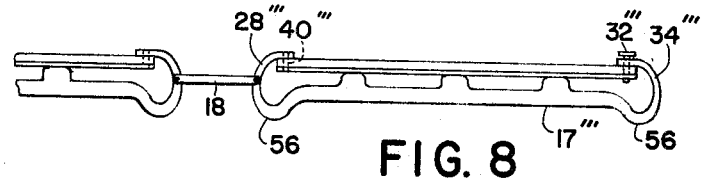
FIG. 8 is side elevation view of another modification of said ski rack.
Figure 7:
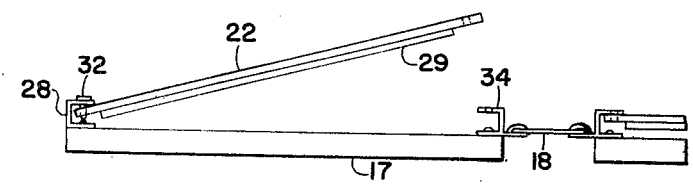
FIG. 7 is a side elevation view of another modification of said ski rack.

FIG. 7 represents another embodiment of ski rack 10 wherein there are no upstanding elements (24 in FIG. 1) on base 17. It should be noted that the material comprising layer 29 may be any suitable material incapable of marring a painted surface, such as rubber. In this embodiment, as well as any other, 29 may be polyethylene tubing and similar plastic materials, and may comprise in conjunction with bar, 22, a plastic-coated metallic member. FIG. 8 represents another embodiment of ski rack, 10, wherein base member 17''' is integral with brackets 28''' and 34''' and comprises a metallic member coated with a plastic or rubber material. The metal may be bent to provide leg members, 56, which would contact the bearing medium, i.e., the rooftop. Other features of this embodiment are as described above.

In addition to the above modifications, it should be noted that the brackets 28, 28', 28'', 34, 34' and 34'', may be in any embodiment, a Z-bracket, or U-bracket, having a hole in the top portion therein for engaging a similar hole, in bar 22, so that a suitable locking device (not shown) may be placed therethrough to securely fasten the bar, 22, in place. Twist brackets (FIG. 2) or any other suitable means for securing bar 22 may be utilized within the context of the instant invention.

Although the ski rack of the instant invention may be of any suitable size, it has been found that the sections 16, 16' and 16'' may be as small as approximately 18½'' in length by 2'' in height by 1½'' in width and still be capable of properly supporting skis. With the sections 16, 16' and 16'' of the above dimensions it can be easily seen that each ski rack in the folded position, when stored, would occupy a space no greater than approximately 18 inches long by 4 inches high and 1½ inches wide.

It must be emphasized that, in contradistinction to ski racks now available, the ski racks of the present invention, except for embodiments wherein the base member comprises a coated metallic member or the like rigid system, is flexible and uniformly contracts the surface of the bearing medium throughout its length, thereby providing a secure ski-retention system in conjunction with the bearing medium. The utilization of unsightly suction cups, which are often difficult to utilize, is additionally obviated.

MODE OF OPERATION

In use the ski rack of the instant invention is mounted upon the roof of an automobile as shown in FIG. 1, with clamps, 12, securely fastening the rack in place. One ski rack is placed on the forward portion of the roof while another rack is placed on the rear portion of the roof. The skis, 20, are positioned between upstanding elements, 24, the bars, 22, being then put in place clamping the skis between the base and the bar. A suitable locking means is then placed through hole 40 in order to hold the bar securely in place.

Figure 2:
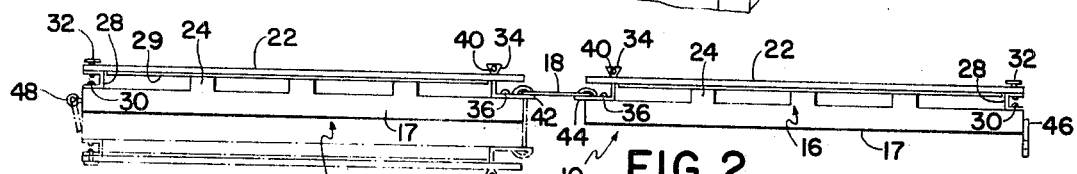
FIG. 2 is a side elevation view of said ski rack wherein the phantom lines represent the ski rack in its folded configuration.
Figures 3, 4:
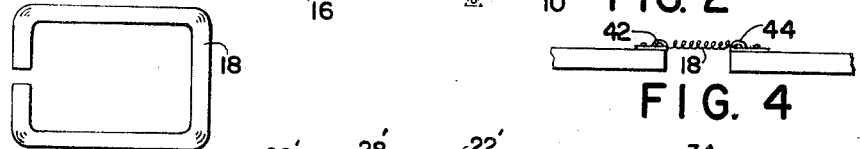
FIG. 3 is a top plan view of a rigid linking member for said ski rack.
FIG. 4 is a fragmentary side elevation view of said ski rack with a resilient linking member.

When not in use the rack is removed from the roof of the automobile and the sections, 16, are folded, one beneath the other, the base of each being capable of remaining in intimate contact with the base of the other throughout the lengths thereof, as shown in phantom in FIG. 2, with the locking means, 46 and 48, securely holding the sections in place.

What is claimed is:

1. A foldable ski rack comprising a single, rigid linking member; first and second identical sections pivotally fastened together by said linking member, each of said sections comprising a base member; a bar loosely fastened to each base member adjacent one end thereof; a bracket mounted adjacent the other end of each base member, said bracket being capable of securing said bar above each base member whereby skis carried in said rack are secured in place; means for fastening each section to a vehicle; said linking member connecting one end of said first section to one end of said second section in position so that said first and said second sections may be folded, one beneath the other, the base member of each section being capable of remaining in intimate contact with the base member of the other section along the entire lengths of said base members for the purpose of storage when said ski rack is not in use.

2. The invention of claim 1 wherein said bar is metallic and has a non-marring material secured thereto along the length thereof directly adjacent to said base.

3. The invention of claim 2 wherein said base is rubber.

4. The invention of claim 1 wherein said base has a plurality of upstanding elements thereon the side thereof adjacent to said bar.

5. The invention of claim 4 wherein said base is capable of assuming the contour of the surface upon which it is borne.

6. The invention of claim 4 wherein said base is rubber, and said bar has a non-marring material secured thereto on the side of said bar adjacent to said upstanding elements.

7. The invention of claim 6 wherein each base has at least one lengthwise groove and a plurality of crosswise grooves in the bottom thereof.

8. The invention of claim 7 wherein said rigid linking member is of rectangular configuration and each of said mounts extends slightly beyond the edge of said bases.

9. The invention of claim 8 wherein said first section contains one part of a fastening device and said second section contains a cooperating part of said fastening device, wherein said parts cooperate to secure said rack in the folded configuration when not in use.

References Cited

UNITED STATES PATENTS

| | | | |
|---|---|---|---|
| 3,225,987 | 12/1965 | Bonner | 224—45 |
| 2,630,257 | 3/1953 | Nielsen | 224—42.1 |
| 2,720,350 | 10/1955 | Felton | 224—42.1 |

FOREIGN PATENTS

| | | |
|---|---|---|
| 61,538 | 10/1939 | Norway. |
| 176,134 | 9/1953 | Austria. |
| 1,117,290 | 2/1956 | France. |
| 1,443,897 | 5/1966 | France. |
| 93,179 | 11/1938 | Sweden. |
| 530,560 | 1955 | Italy. |

GERALD M. FORLENZA, Primary Examiner

F. E. WERNER, Assistant Examiner

UNITED STATES PATENT OFFICE
CERTIFICATE OF CORRECTION

Patent No. 3,512,689                          May 19, 1970

James Metropoulos

It is certified that error appears in the above identified patent and that said Letters Patent are hereby corrected as shown below:

Column 2, line 63, "number" should read -- member --.
Column 4, line 2, after "thereon" insert -- on --.

Signed and sealed this 16th day of February 1971.

(SEAL)
Attest:

Edward M. Fletcher, Jr.                    WILLIAM E. SCHUYLER, JR.
Attesting Officer                            Commissioner of Patents